United States Patent [19]

Journeau

[11] Patent Number: 4,964,165
[45] Date of Patent: Oct. 16, 1990

[54] METHOD FOR THE FAST SYNCHRONIZATION OF VOCODERS COUPLED TO ONE ANOTHER BY ENCIPHERING

[75] Inventor: Rémy Journeau, Paris, France

[73] Assignee: Thomson-CSF, Paris, France

[21] Appl. No.: 231,563

[22] Filed: Aug. 12, 1988

[30] Foreign Application Priority Data

Aug. 14, 1987 [FR] France .................................. 87 11584

[51] Int. Cl.$^5$ .............................................. H04L 9/00
[52] U.S. Cl. .................................... 380/48; 375/115; 370/29
[58] Field of Search .......................... 380/48; 375/115; 370/29

[56] References Cited

U.S. PATENT DOCUMENTS

| | | | |
|---|---|---|---|
| 4,172,963 | 10/1979 | Belcher et al. | 380/48 |
| 4,182,933 | 1/1980 | Rosenblum | 380/48 |
| 4,208,544 | 6/1980 | Burke, Jr. | 380/48 |
| 4,392,241 | 7/1983 | Hurst | 380/48 |
| 4,661,657 | 4/1987 | Grenzebach et al. | 380/48 |
| 4,817,146 | 3/1989 | Szczutkowski | 380/48 |

FOREIGN PATENT DOCUMENTS

| | | |
|---|---|---|
| 44780 | 1/1982 | European Pat. Off. |
| 1521029 | 8/1978 | United Kingdom . |
| 2089599 | 6/1982 | United Kingdom . |

OTHER PUBLICATIONS

IEEE Global Telecommunications conference, Co-munications Broadening Technology Horizons, Conference Record, vol. 2, Houston, Tex., 1-4 Dec. 1986, pp. 813-817.

IEEE Communications Society etc., New York, U.S.; A. Taha et al.: "Speech encrytion in Linear predictive coding (LPC) System" *p. 813, "colonne de droite, dernier linea-p. 814, colonne de gauech, ligne 17; colonne de droite, dernier linea".

Conference Proceedings of Military Microwaves '84, 24-26 oct. 1984, Londres, pp. 50-54, Microwave Exhibitions and Publishers Ltd, Tunbridge Wells, Kent, GB; G. J. Proudler: "Bulk encryption for wideband applications" *p. 51, dernier alinea-p. 52, ligne 26*.

Primary Examiner—Thomas H. Tarcza
Assistant Examiner—David Cain
Attorney, Agent, or Firm—Cushman, Darby & Cushman

[57] ABSTRACT

A method for the fast synchronization of vocoders, coupled to each other by means of enciphering and deciphering devices, consists in synchronizing the data frames transmitted by the vocoders with the end of the sequence for synchronizing the enciphering and deciphering devices, in transmitting the decryption data for a period equal to a whole multiple of the duration of a digital frame of speech data transmitted and in synchronizing the called vocoder with the end of transmission of the decryption data. Thus, a gain is obtained in the synchronization acquisition time.

10 Claims, 2 Drawing Sheets

METHOD FOR THE FAST SYNCHRONIZATION OF VOCODERS COUPLED TO ONE ANOTHER BY ENCIPHERING

BACKGROUND OF THE INVENTION

1. Field of the Invention

The present invention concerns a method for the fast synchronization of vocoders coupled to one another by enciphering and deciphering devices.

2. Description of the Prior Art

In enciphering devices using vocoders, speech transmission between vocoders takes place digitally. The speech signals are first sampled and then encoded by the vocoder before being applied to the associated enciphering device. At reception, the samples of the speech signal enciphered by the enciphering device of the transmitter are deciphered and then applied to the reception vocoder.

To make the set thus formed work efficiently, it is necessary to see to the synchronization of the enciphering devices and as well as that of the transmission and reception vocoders. In known systems, a first cipher function synchronizing stage accurately initializes of the reception enciphering devices and a second stage synchronizes the vocoder function. This latter stage is undertaken only when the previous one is completed.

Since these two stages are performed sequentially, without the second stage being dependent in any way whatsoever on the first stage, the synchronizing of the vocoder/enciphering device set takes time.

In radio transmission mode, on HF channels for example, in the 1 to 30 Mhz frequency range, the average time taken to achieve synchronization is in the range of a few seconds. Since vocoders are generally used alternately between two speakers, or in conference mode among several speakers, the synchronization periods obtained are prohibitively long and are really troublesome for users.

SUMMARY OF THE INVENTION

An aim of the invention is to remove the above-mentioned drawbacks.

To this end, an object of the invention is a method for the fast synchronization of vocoders coupled to one another by enciphering and deciphering devices of the type where the link between vocoders is initialized by the enciphering device of the calling vocoder by means of a cipher sequence comprising at least one synchronizing sequence, followed by a transmission of decryption information and wherein the digital speech data transmitted are organized in each vocoder in digital frames comprising a defined number of bits, said method consisting in the synchronizing of the information frames transmitted by the vocoders with the end of the sequence in which the enciphering and deciphering devices are synchronized, the transmitting of the decryption data for a period equal to a whole multiple of the duration of a digital frame of transmitted speech data and the synchronizing of the called vocoder with the end of the transmission of the decryption data.

BRIEF DESCRIPTION OF THE DRAWINGS

Other features and advantages of the invention will appear below from the following description, made with reference to the appended drawings, of which.

DETAILED DESCRIPTION OF THE INVENTION

Figure 1:
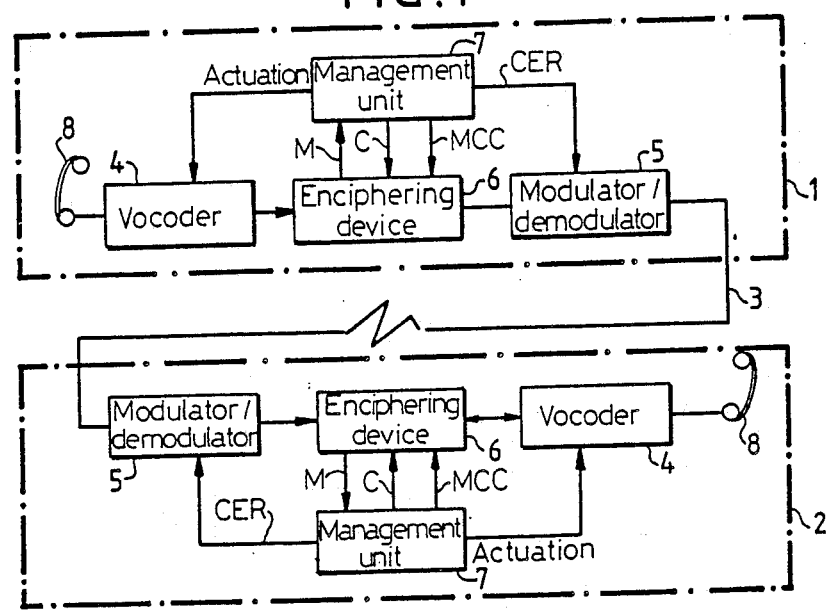
FIG. 1 shows a transmission system comprising vocoders coupled to enciphering and deciphering devices implementing the method according to the invention.

The transmission system shown in FIG. 1 consists of two stations, 1 and 2, which communicate with each other alternately on a transmission channel 3. Each station has the following elements, bearing the same reference numbers: a vocoder 4 coupled to a modulator/demodulator 5 through an enciphering/deciphering device 6. The set is controlled by a management unit 7 consisting of a microprocessor or any equivalent device which provides for the management and sequencing of the information transmitted by each of the stations, the preparation, by the vocoder 4, of the speech data as well as the conversion of these data by the enciphering device 6. A telephone set 8 is used to apply the users' speech to the vocoder 4 and for its reception.

Figure 2A:
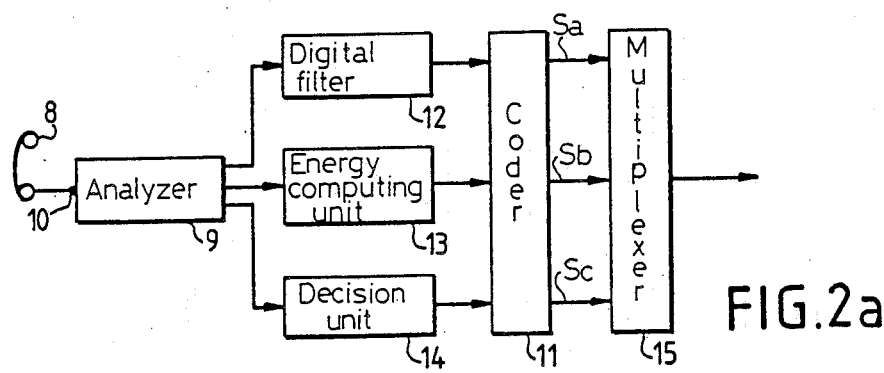
FIG. 2a and 2b show a conventional vocoder.
Figure 2B:
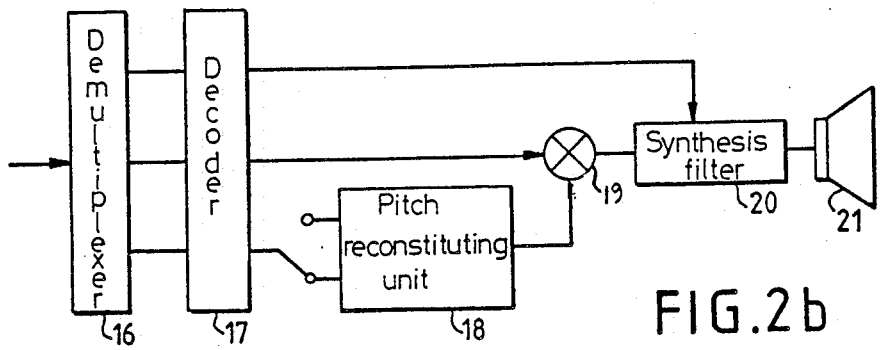

A vocoder is shown in FIGS. 2a and 2b. The transmission part of the vocoder, shown in FIG. 2a, comprises a spectrum analyzer 9 which receives the signals obtained from the telephone set 8 at an input 10. The analyzer 9 is coupled to an encoder 11 through a digital filter 12, an energy computing unit 13 and a decision unit 14, respectively. The spectrum analyzer 9 does a spectral analysis of the speech signal approximately every 20 ms, determining the parameters needed by the filter 12 to build the most accurate possible model of the vocal conduit. The decision unit 14 determines whether the vocal signal has a pitch period or not and the computing unit 13 computes the energy of the signal in a temporal window which has a length determined by a defined number p of samples given by the spectrum analyzer 9. These results are all applied to the input of the encoder 11, which produces digital sequences of binary signals Sa, Sb, and Sc. The signals Sa, Sb, and Sc are applied to the input of a multiplexer 15 which forms a digital frame consisting of these three signals Sa, Sb, and Sc under the control of the management unit 7 of FIG. 1.

A synthesized vocal signal is received at a reception part of the vocoder as shown in FIG. 2b. The reception part of the vocoder comprises a demultiplexer 16 for the digital frame formed by the sequences of binary signals Sa, Sb, Sc, a decoder 17 which decodes each of the sequences of demultiplexed binary signals Sa, Sb, and Sc, a pitch reconstituting unit 18 for reconstituting the character (with or without pitch period) of the speech signal, a multiplier circuit 19, and a synthesis filter 20 coupled to an electro-acoustic reception unit or loudspeaker 21.

Figure 3:
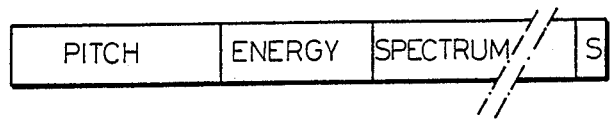
FIG. 3 shows a conventional format of a vocoder frame transmitted by a vocoder of the type shown in FIGS. 2a and 2b.
Figure 4:
FIG. 4 shows the format of the decryption data transmitted by the enciphering devices.

According to a known example, for example, in the THOMSON-CSF Journal, Vol. 18, No. 1, Gautier Villars, March 1986, the architecture of the vocoder shown in FIGS. 2a and 2b provides, in 22.5 ms temporal windows, digital frames of 54 bits of which 7 bits represent a pitch indication signal which we will call Sc determined by decision unit 14, 5 bits represent the energy signal (Sb) computed by energy computing unit 13, 41 bits represent the spectrum signal (Sa) provided by digital filter 12, and 1 bit forms a synchronization bit S. The corresponding digital frame is shown in FIG. 3. The cipher function is synchronized in a standard way by the management of a digital frame of the type shown in FIG. 4. In this figure, the frame is split up into three sequences: a roll sequence RS, a pseudo-random sequence PNS also called a PN sequence, PN being the abbreviation for "pseudo-noise" and a sequence comprising decryption data. The roll sequence RS is conventionally formed by an alternating sequence of bits at 1 and 0 and enables the recognition, by the reception vocoder of the bit synhronization of the digital frames transmitted on the transmission channel 3. The PN sequence is obtained conventionally by a shift register with N stages comprising an input and an output, coupled to each other through one or more modulo 2 adders receiving operand data through one or more intermediate connectors of the shift register. This type of circuit generates a periodic pseudo-random sequence with a length of $2^N-1$ bits. The reverse operation, which takes place at reception, is also performed by means of a generator of pseudo-random sequences which is identical to the one used for transmission and is synchronized with it. The reciever's recognition of the PN sequence enables recognition of the synchronization of the digital frames transmitted on the transmission channel. The end of the PN sequence generally marks the start of the useful data needed to synchronize the enciphering unit of the receiver. These data, which are transmitted between the enciphering device 6 and the management unit 7, comprise the following in a known way: a key number "C", marker bits "M" (time markers for example) and an enciphered checking word "MCC" which enables the receiving party to check the validity of the received synchronization of the enciphering and deciphering device, after deciphering.

Figure 5:
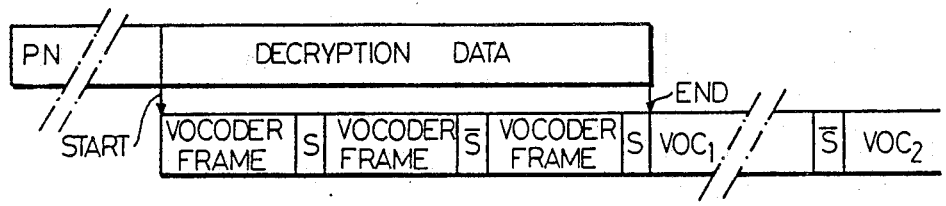
FIG. 5 shows an example giving the relative position of the cipher sequence with respect to the fixing of the vocoder frames rate, used to obtain the synchronization of the vocoder frames with the frames of the enciphering and deciphering devices.

According to conventional methods, two synchronizing stages are required: a first stage for synchronizing the enciphering and deciphering function and a second stage for synchronizing the vocoder function, which is undertaken after completion of the first stage. However, the method according to the present invention references the digital frames transmitted by the calling vocoder to the synchronization acquired by the enciphering and deciphering device, thereby eliminating the second stage for synchronizing the vocoder function. As shown in FIG. 5, this aim is achieved by building a frame of enciphered synchronization digital data coherent with the length of an elementary vocoder frame, such as the digital frame shown in FIG. 3. In FIG. 5, the length of the zone reserved for the decryption data is determined to be a whole multiple of the length of an elementary vocoder frame. Thus, several elementary vocoder frames may be contained within the decryption data zone. Further, as shown in FIG. 5, synchronizing bits S, S may be employed to separate each elementary vocoder frame. Thus, the calling vocoder can be initialized as soon as the transmission of the PN sequence is ended and the reception vocoder can be initialized upon reception of the last bit of the decryption sequence.

Management unit 7 controls these various actions in accordance with a suitable program. This program enables the management unit 7 to send a signal to actuate the calling vocoder 4 upon completion of the PN sequence performed by the enciphering and deciphering device 6, and enables the management unit 7 to actuate the reception vocoder 4 as soon as the deciphering device 6 detects the end of the decryption information.

What is claimed is:

1. A method for fast synchronization of vocoders which are coupled to one another by enciphering and deciphering devices of a type where an enciphering device of a calling vocoder initializes communication by means of a cipher sequence comprising at least one synchronizing sequence, and then transmits decryption data, and wherein digital speech data to be transmitted are organized in each vocoder in digital frames comprising a defined number of bits, said method comprising the steps of:

synchronizing said digital frames transmitted by said vocoders with an end of a synchronizing sequence in which said enciphering and deciphering devices are synchronized, transmitting said decryption data for a period equal to a whole multiple of a duration required to transmit said digital frame of said digital speech data, and synchronizing a receiving vocoder with an end of said transmission of said decryption data.

2. A method according to claim 1 wherein said transmissions between vocoders take place alternately in successive digital frames as soon as said receiving vocoder acquires synchronization of said calling vocoder.

3. A method according to claim 1 wherein said synchronizing sequence for synchronizing said enciphering devices comprises the step of forming a sequence of a fixed number of pseudo-noise type pseudo-random bits.

4. A method according to claim 3 further comprising the step of transmitting a roll sequence prior to said synchronizing sequence.

5. A method according to claim 1 further comprising the step of managing said decryption data in said receiving vocoder after receipt of transmitted decryption data by use of a key number, marker bits and an enciphered checking word.

6. A method according to claim 1, wherein said organization of said digital frames comprises the steps of:

combining a first bit string indicative of whether a speech signal input to said calling vocoder has a pitch period, a second bit string indicative of an energy of said speech signal, and a third bit string representing spectrum samples of said speech signal such that a number of bits of all said bit strings combined equals said defined number of bits of said digital frame; and attaching a synchronizing bit to an end of said combined bit strings.

7. A method for synchronizing vocoders comprising the steps of:

organizing, in a calling vocoder, a plurality of digital frames, each said digital frame having a defined number of bits, into decryption data;

synchronizing commencement of transmission of said decryption data from said calling vocoder with completion of a synchronizing sequence;

transmitting said decryption data from said calling vocoder for a period equal to a whole multiple of a duration required to transmit one of said digital frames; and synchronizing reception of said decryption data in a receiving vocoder with completion of said transmission of said decryption data.

8. A method according to claim 7, wherein said organizing step comprises the steps of:
combining a first bit string indicative of whether a speech signal input to said calling vocoder has a pitch period, a second bit string indicative of an energy of said speech signal, and a third bit string representing spectrum samples of said speech signal such that a number of bits of all said bit strings combined equals said defined number of bits of said digital frame; and
attaching a synchronizing bit to an end of said combined bit strings.

9. A method for synchronizing vocoders comprising the steps of:
initializing communication between a calling vocoder and a receiving vocoder with at least one synchronizing sequence;
organizing within said calling vocoder a plurality of digital frames of a defined number of bits, wherein said organizing step comprises the steps of:
(a) combining a first bit string indicative of whether a speech signal input to said calling vocoder has a pitch period, a second bit string indicative of an energy of said speech signal, and a third bit string representing spectrum samples of said speech signal such that a number of bits of all said bit strings combined equals said defined number of bits of said digital frame; and
(b) attaching a synchronizing bit to an end of said combined bit strings;
synchronizing transmission of said digital frames from said calling vocoder with completion of said synchronizing sequence;
transmitting said digital frames in whole multiples;
synchronizing a receiving vocoder to receive said digital frames upon completion of said transmission of said digital frames; and
repeating communication of said digital frames between said calling vocoder and said receiving vocoder in an alternating manner.

10. A transmission system comprising:
an enciphering device for enciphering speech data, and generating at least one synchronizing sequence used in said enciphering;
a vocoder transmitter, coupled to said enciphering device, for encoding whole numbers of digital frames indicative of speech data at an end of a synchronizing sequence, each said digital frame having a predetermined number of bits;
a deciphering for recognizing said synchronizing sequence and said end of said synchronizing sequence and for recognizing an end of said digital frames; and
a vocoder receiver, coupled to said deciphering, for decoding said digital frames at said end of said whole numbers of digital frames.

* * * * *